Patented Dec. 8, 1942

2,304,426

UNITED STATES PATENT OFFICE 2,304,426

THIAZYL SULPHIDES

Robert L. Sibley, Nitro, W. Va., assignor to Monsanto Chemical Company, St. Louis, Mo., a corporation of Delaware No Drawing. Application July 10, 1940, Serial No. 344,686

11 Claims. (Cl. 260—306)

The present invention relates to the preparation of aryl thiazyl disulphides and more particularly to the utilization of hypochlorites for the preparation of aryl thiazyl disulphides from the corresponding mercaptans.

The hypochlorites are among the cheapest oxidizing agents known but at least as applied to the oxidation of mercapto aryl thiazoles have heretofore provided inferior products as well as unsatisfactory yields. However, it has been discovered in accordance with the present invention that excellent results may be obtained with hypochlorites providing there is employed an alkaline solution of the thiazole at a fairly definite pH. That is to say the hydrogen ion concentration must be controlled throughout the oxidation within limits hereinafter defined.

Since a potentiometric method for measuring pH is convenient where frequent or continuous readings are to be taken as is desirable in the present process, reference will be had to the difference in potential in millivolts between an antimony electrode (indicator electrode) and a saturated calomel half cell as the standard reference electrode, measurement being made by a suitable potentiometer. Expressed as millivolts the oxidation of the mercapto aryl thiazole is carried out at a pH corresponding to 550–650 millivolts as determined by the system Sb-sat. calomel. For best results the potential should be maintained at around 600 millivolts. The exact pH corresponding to these potentials is somewhat uncertain because the so called "salt error" is appreciable in strongly alkaline solutions. For example the range of pH units corresponding to 550–650 millivolts given by any reliable pH instrument is about 9.7–11.5 and the pH corresponding to the optimum potential of 600 millivolts is 10.6 pH units. However, for a solution which is 1.0 N with respect to sodium ion a correction of about 0.58 pH units must be added to the latter figure so that the optimum pH is probably nearer 11.1 than 10.6. It will of course be appreciated that other methods of measuring pH may be utilized where convenient or desirable or other suitable reference and standard electrodes employed in a potentiometric measurement. While it is to be expressly understood that this invention is not limited to any particular method for measuring pH an antimony electrode in conjunction with a standard half cell is particularly convenient and perfectly reproducible. For the sake of greater precision in describing the conditions for carrying out the reaction differences in electrode potential rather than pH will be referred to in the description following.

The preferred procedure comprises adding a solution of a hypochlorite to an alkaline thiazole solution while maintaining the reaction mixture at a pH corresponding to about 600 millivolts (Sb-sat. calomel). The control of the pH may be accomplished by the concurrent addition with the hypochlorite of an acidic material as for example a mineral acid. The rate of addition of the oxidizing agent as well as that of the acid is governed solely by the control of the pH. Thus, hypochlorite may be added as rapidly as is compatible with the degree of control desired but in general the hypochlorite must be added slowly in order to permit control of the reaction mixture at around 600 millivolts.

Good results are obtained with hypochlorite solutions of around 8–10% active hypochlorite but other concentrations may be used where desired. Suitable hypochlorites comprise the alkali metal hypochlorites. While hypobromites and hypoiodides behave in similar manner they are of little practical interest due to their comparatively high cost.

Contrary to expectations a much larger amount of hypochlorite than that theoretically required is necessary for complete oxidation. The general reaction involved is believed to be represented as follows:

$$2RSM + M'ClO + H_2O \rightarrow RSS\text{-}R + 2MOH + M'Cl$$

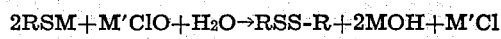

where R represents an aryl thiazyl group M and M' represents alkali metal. It is evident that one molecular proportion of hypochlorite should be sufficient to oxidize two molecular proportions of thiazole. As a matter of fact the molecular proportion of hypochlorite required is equal to or even greater than that of the mercaptothiazole.

The oxidation proceeds most smoothly at a temperature between 10°–30° C. and within this range somewhat better yields are obtained at around 20° C. than at the extremes.

The following are specific examples of the invention and are to be understood as illustrative but in nowise limitative of the scope thereof.

Example I

Into a suitable reaction vessel fitted with a stirrer there was charged 332 parts by weight of an aqueous solution of sodium mercaptobenzothiazole containing 12.57% mercaptobenzothiazole by weight (substantially 0.25 molecular proportion). An antimony electrode and a standard saturated calomel half cell were inserted into the solution and sufficient caustic alkali added to bring the potential up to 600 millivolts. To the efficiently stirred solution at a temperature of about 20° C. there was slowly added 182 parts by weight of an aqueous solution containing about 10% sodium hypochlorite by weight (substantially 0.25 molecular proportion). During the addition of the latter the potential was maintained at about 600 millivolts which required the concurrent addition of about 27 parts by weight of 40% sulphuric acid. Since the desired product was insoluble in water it was readily isolated, after the completion of the reaction by a filtration step, washed with water and dried. The yield was 95.2% theory of di benzothiazyl disulphide M. P. 170-174° C.

The reaction is quite sensitive to pH. For example when the reaction was carried out identically as described above except that a potential of 532-550 millivolts was maintained the yield was 4% lower. Likewise increasing the potential to 650 millivolts or above, that is to say increasing the alkalinity by an amount corresponding to 50 millivolts lowered the yield from 6 to 8% and when operating at a still higher alkalinity (700 millivolts) the yield was lowered 22%. Other factors, however, are not critical. For example the concentration of the mercapto aryl thiazole solutions may be widely varied as desired. Concentrations as low as about 8% and as high as about 27% gave consistently good results. In addition while it is desirable to use enough hypochlorite to assure maximum yields, greater amounts may be employed and as mentioned above the strength of the hypochlorite solutions is not important. However, the presence of substantial amounts of free alkali should be avoided.

*Example II*

Into a suitable reaction vessel fitted with an efficient stirrer, an antimony electrode and a standard saturated calomel half cell there was charged 650 parts by weight of sodium mercaptobenzothiazole solution containing 10.2% mercaptobenzothiazole by weight (substantially 0.4 molecular proportion). The potential of the solution was adjusted to 600 millivolts by the addition of 0.35 part by weight of 25% caustic soda. To the rapidly stirred solution at a temperature of 15-25° C. there was added 372 parts by weight of 10% sodium hypochlorite (substantially 0.5 molecular proportion) at such a rate that the potential could be maintained at 590-610 millivolts. This required the concurrent addition of about 41.5 parts by weight of 40% sulphuric acid. After completion of the reaction the insoluble reaction product was filtered from the aqueous vehicle, thoroughly washed with water to remove any entrained salts and dried. The average yield over a number of similar preparations was 92.2% of theory M. P. 170-176° C.

*Example III*

Into a suitable reactor fitted with an efficient stirrer there was charged 24.3 parts by weight of 4 phenyl mercaptobenzothiazole, 200 parts by weight of water and 16 parts by weight of 25% caustic soda. The mixture was warmed to effect solution then cooled to about 20° C. and the potential adjusted to 600 millivolts (Sb-sat. calomel). This latter required the addition of a small amount of 40% sulphuric acid. To the rapidly stirred solution there was then added over a period of one-half hour, 75 parts by weight of an approximately 10% solution of sodium hypochlorite. During the oxidation the reaction mixture was maintained at a pH corresponding to a potential of 600-610 millivolts by adding concurrently with the oxidizing agent, 40% sulphuric acid as required (about 9.7 parts by weight). After completion of the reaction the insoluble reaction product was filtered from the aqueous vehicle, washed with water and dried. The yield of di 4 phenyl benzothiazyl disulphide was 97% of the theoretical, M. P. 167-176° C. Where a product of higher purity is desired the step of recrystallizing from an organic solvent may be introduced. For example one recrystallization from dioxane improved the color and raised the melting point to 200-203° C.

*Example IV*

Into a suitable reactor fitted with an efficient stirrer there was charged 20.15 parts by weight of 5 chlor mercaptobenzothiazole, 165 parts by weight of water and 16 parts by weight of 25% caustic soda. The charge was heated to effect solution and cooled to 20° C. and the potential adjusted to 600 millivolts (Sb-sat. calomel). The latter required the addition of a small amount of 40% sulphuric acid. To the rapidly stirred solution there was then added 75 parts by weight of an approximately 10% solution of sodium hypochlorite while maintaining the reaction mixture at a pH corresponding to 600-610 millivolts as described in the above examples. The insoluble product which separated was filtered from the aqueous vehicle, washed with water and dried. The yield of di 5 chlor benzothiazyl disulphide was 87% of the theoretical yield, M. P. 211-215° C.

Obviously the specific procedures described in the foregoing examples may be widely varied without departing from the spirit or scope of the present invention. This invention is limited solely by the claims attached hereto as part of the present specification.

What is claimed is:

1. The method of making a di(arylene thiazyl) disulphide by oxidizing the corresponding mercapto arylene thiazole which comprises adjusting a solution of the mercapto arylene thiazole to a pH corresponding to about 550 to 650 millivolts as measured by the system Sb-sat. calomel, then oxidizing the mercapto arylene thiazole with a hypochlorite while maintaining the reaction mixture at the said pH of the intial solution.

2. The method of making a di(arylene thiazyl) disulphide by oxidizing the corresponding mercapto arylene thiazole which comprises adjusting an aqueous solution of an alkali metal salt of the mercapto arylene thiazole to a pH corresponding to about 550 to 650 millivolts as measured by the system Sb-sat. calomel, then oxidizing the mercapto arylene thiazole with an alkali metal hypochlorite while maintaining the reaction mixture at the said pH of the initial solution.

3. The method of making a di(arylene thiazyl) disulphide by oxidizing the corresponding mercapto arylene thiazole which comprises adjusting an aqueous solution of an alkali metal salt of the mercapto arylene thiazole to a pH corresponding to about 550 to 650 millivolts as measured by the system Sb-sat. calomel, then gradually adding the quantity of hypochlorite actually required to oxidize substantially all of the mercapto arylene thiazole while maintaining the reaction mixture at the said pH of the initial solution.

4. The method of making a dibenzothiazyl disulphide by oxidizing the corresponding mercaptobenzothiazole which comprises adjusting an aqueous solution of an alkali metal salt of the mercaptobenzothiazole to a pH corresponding to about 600 millivolts as measured by the system Sb-sat. calomel, then oxidizing the mercaptobenzothiazole with an alkali metal hypochloride while maintaining the reaction mixture at the said pH of the initial solution.

5. The method of making a dibenzothiazyl disulphide by oxidizing the corresponding mercaptobenzothiazole which comprises adjusting an aqueous solution of an alkali metal salt of the mercaptobenzothiazole to a pH corresponding to about 550 to 650 millivolts as measured by the system Sb-sat. calomel, then gradually adding an alkali metal hypochlorite in an amount substantially the molar equivalent of the mercaptobenzothiazole while maintaining the reaction mixture at the said pH of the initial solution.

6. The method of making a dibenzothiazyl disulphide by oxidizing the corresponding mercaptobenzothiazole which comprises adjusting an aqueous solution of an alkali metal salt of the mercaptobenzothiazole to a pH corresponding to about 550 to 650 millivolts as measured by the system Sb-sat. calomel, then oxidizing the mercaptobenzothiazole at 10-30° C. by gradually adding the quantity of an alkali metal hypochlorite actually required to oxidize substantially all of the mercaptobenzothiazole while maintaining the reaction mixture at the said pH of the initial solution.

7. The method of making dibenzothiazyl disulphide by oxidizing mercaptobenzothiazole which comprises adjusting a solution of mercaptobenzothiazole to a pH corresponding to about 550 to 650 millivolts as measured by the system Sb-sat. calomel, then oxidizing the mercaptobenzothiazole with a hypochlorite while maintaining the reaction mixture at the said pH of the initial solution.

8. The method of making dibenzothiazyl disulphide by oxidizing mercaptobenzothiazole which comprises adjusting an aqueous solution of an alkali metal salt of mercaptobenzothiazole to a pH corresponding to about 600 millivolts as measured by the system Sb-sat. calomel, then oxidizing the mercaptobenzothiazole at about room temperature by gradually adding an alkali metal hypochlorite in an amount substantially the molar equivalent of the mercaptobenzothiazole while maintaining the reaction mixture at the said pH of the initial solution.

9. The method of making di[4-phenyl benzothiazyl] disulphide by oxidizing mercapto 4-phenyl benzothiazole which comprises adjusting an aqueous solution of an alkali metal salt of mercapto 4-phenyl benzothiazole to a pH corresponding to about 600 millivolts as measured by the system Sb-sat. calomel, then oxidizing the mercapto 4-phenyl benzothiazole at about room temperature by gradually adding an alkali metal hypochlorite in an amount substantially the molar equivalent of the mercapto 4-phenyl benzothiazole while maintaining the reaction mixture at the said pH of the initial solution.

10. In the process of oxidizing a mercapto arylene thiazole to the corresponding disulphide by means of a hypochlorite, the steps which comprise gradually adding the hypochlorite to an aqueous solution of the mercapto arylene thiazole of a pH corresponding to about 550 to 650 millivolts as measured by the system Sb-sat. calomel and adding concurrently therewith a mineral acid at such rate and in such amount as to maintain the reaction mixture at the said pH of the initial solution during the oxidation.

11. In the process of oxidizing mercaptobenzothiazole to the corresponding disulphide by means of a hypochlorite, the steps which comprise gradually adding the hypochlorite to an aqueous solution of mercaptobenzothiazole of a pH corresponding to about 600 millivolts as measured by the system Sb-sat. calomel and adding concurrently therewith a mineral acid at such rate and in such amount as to maintain the reaction mixture at the said pH of the initial solution during the oxidation.

ROBERT L. SIBLEY.